United States Patent
Matsumoto et al.

(10) Patent No.: US 9,921,091 B2
(45) Date of Patent: Mar. 20, 2018

(54) THERMAL MASS FLOWMETER

(71) Applicant: Hitachi Automotive Systems, Ltd., Hitachinaka-shi, Ibaraki (JP)

(72) Inventors: Masahiro Matsumoto, Tokyo (JP); Hiroshi Nakano, Tokyo (JP); Satoshi Asano, Tokyo (JP); Yasuo Onose, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 124 days.

(21) Appl. No.: 14/910,360

(22) PCT Filed: Feb. 5, 2014

(86) PCT No.: PCT/JP2014/052601
§ 371 (c)(1),
(2) Date: Feb. 5, 2016

(87) PCT Pub. No.: WO2015/019631
PCT Pub. Date: Feb. 12, 2015

(65) Prior Publication Data
US 2016/0178421 A1  Jun. 23, 2016

(30) Foreign Application Priority Data
Aug. 6, 2013  (JP) .................. 2013-162839

(51) Int. Cl.
*G01F 1/68* (2006.01)
*G01F 1/69* (2006.01)
(Continued)

(52) U.S. Cl.
CPC .............. *G01F 1/69* (2013.01); *G01F 1/6845* (2013.01); *G01F 1/696* (2013.01); *G01F 1/698* (2013.01); *G01F 1/699* (2013.01); *G01P 5/12* (2013.01)

(58) Field of Classification Search
CPC ...... G01F 1/698; G01F 1/6983; G01F 1/6986; G01F 1/699
See application file for complete search history.

(56) References Cited

U.S. PATENT DOCUMENTS

| | | | |
|---|---|---|---|
| 5,616,843 A | 4/1997 | Schifferl et al. | |
| 6,752,014 B1 * | 6/2004 | Kanke | G01F 1/6845 73/204.15 |

(Continued)

FOREIGN PATENT DOCUMENTS

| | | |
|---|---|---|
| EP | 0 483 744 A2 | 5/1992 |
| JP | 5-264312 A | 10/1993 |

(Continued)

OTHER PUBLICATIONS

International Search Report (PCT/ISA/210) issued in PCT Application No. PCT/JP2014/052601 dated Mar. 11, 2014 with English-language translation (two (2) pages).

(Continued)

*Primary Examiner* — Justin Olamit
(74) *Attorney, Agent, or Firm* — Crowell & Moring LLP

(57) ABSTRACT

In order to provide a thermal mass flowmeter which makes higher accuracy of gas flowrate measurement possible while reliability in the thermal mass flowmeter is ensured (while deterioration or breakage caused by droplet adhesion is prevented), the thermal mass flowmeter according to the present invention has a heating element for generating heat by conduction, a temperature detection bridge circuit for detecting a temperature of the heating element, and a sensor element driving circuit portion connected to the heating element and the temperature detection bridge circuit and executing conduction control to the heating element, in which the sensor element driving circuit portion has an output mechanism and an output impedance adjustment mechanism and the output impedance adjustment mecha- (Continued)

nism is disposed between the output mechanism and the heating element and its output impedance is higher than an electric resistance value of the heating element and less than 1 MΩ.

6 Claims, 13 Drawing Sheets

(51) Int. Cl.
    *G01F 1/699*     (2006.01)
    *G01P 5/12*     (2006.01)
    *G01F 1/684*     (2006.01)
    *G01F 1/696*     (2006.01)
    *G01F 1/698*     (2006.01)

(56) References Cited

U.S. PATENT DOCUMENTS

| | | | | |
|---|---|---|---|---|
| 6,839,643 | B2* | 1/2005 | Kanke | G01F 1/6845 |
| | | | | 701/102 |
| 8,225,652 | B2* | 7/2012 | Muraoka | G01F 1/6845 |
| | | | | 73/204.15 |
| 2007/0084280 | A1* | 4/2007 | Gill | G01F 1/698 |
| | | | | 73/204.27 |

FOREIGN PATENT DOCUMENTS

| | | |
|---|---|---|
| JP | 2001-91323 A | 4/2001 |
| JP | 3468727 B2 | 11/2003 |
| JP | 2004-45408 A | 2/2004 |
| JP | 2004-226289 A | 8/2004 |
| JP | 2012-207925 A | 10/2012 |
| WO | WO 89/05967 A1 | 6/1989 |

OTHER PUBLICATIONS

Cover page of EP 0 395 721 A1 published Nov. 7, 1990 (one (1) page).

Extended European Search Report issued in counterpart European Application No. 14833831.2 dated Mar. 27, 2017 (eight (8) pages).

* cited by examiner

THERMAL MASS FLOWMETER

TECHNICAL FIELD OF THE INVENTION

The present invention relates to a flowrate measuring device of a compressive fluid and particularly to a thermal mass flowmeter for measuring a mass flowrate of a gas flow on the basis of movement of heat from a heating element by the gas flow.

DESCRIPTION OF BACKGROUND ART

As a device for measuring a flowrate of a compressive fluid such as a gas, a thermal mass flowmeter (also referred to simply as a thermal flowmeter) is known, and it is widely used as a measuring device of an intake air amount in an electronically controlled fuel injection device of an internal combustion engine. In the thermal mass flowmeter, if a foreign substance adheres to a sensor portion, measurement accuracy is extremely lowered and thus, use in a clean gas-flow environment is required in general.

However, in an actual use environment such as an electronically controlled fuel injection device, condensation is generated by fluctuation in an air temperature/humidity, and droplets adhere to the sensor portion in some cases. If the droplets adhere to the sensor portion, a temperature balance is lost, and a part of the sensor portion is locally brought into an overheated state, whereby the sensor portion is thermally deteriorated or the thermal flowmeter itself is broken in some cases.

Thus, in order to prevent a serious failure from occurring even if foreign substances such as droplets adhere to the sensor portion, various technologies have been developed. For example, in Patent Literature 1 (JP 2001-91323 A), in a thermal air flowmeter for internal combustion engine including a resistive heat generation film provided on a thin portion formed on a silicon substrate and a control circuit for controlling an applied voltage to be applied to the resistive film or a conduction current to be conducted, in which the resistive film is disposed in an intake pipe of the internal combustion engine, and heat is emitted to the air through the resistive film, a thermal air flowmeter for internal combustion engine characterized in that, when droplets adhere to the resistive film, the applied voltage is controlled to be smaller than a voltage applied to the resistive film in measurement of a maximum rated measurement range or the conduction current is controlled to be smaller than a current flowing through the resistive film in measurement of a maximum specified measurement range is disclosed. According to PTL 1, by discriminating and detecting a case in which water droplets, oil droplets or the like adhere to the heating resistor portion and a normal case without droplets, a heated state can be limited only when the water droplets, oil droplets or the like adhere to the heat resistor portion without narrowing the original flowrate measurement range and deterioration of the resistor can be prevented, and it is considered that reliability of the thermal air flowmeter can be ensured. Moreover, since heat capacities of the thin portion and the resistive heat generation film are small, it is considered that responsiveness of rising at power-on can be improved.

In Patent Literature 2 (JP 2012-207925 A), a thermal air flowmeter including a sensor portion having a heat generating heater generating heat by conduction and disposed in an air passage, a heater temperature control portion for controlling a temperature of the heat generating heater so that a temperature difference between the air flowing through the air passage and the heat generating heater becomes constant, and a flowrate detection portion for detecting an air flowrate flowing through the air passage on the basis of a radiation amount from the heat generating heater, in which a liquid body adhesion determining means for determining whether or not a liquid body such as moisture, oil or the like adheres to the sensor portion is provided, and this liquid body adhesion determining means receives an input of a signal relating to an air flowrate from the heater temperature control portion and the flowrate detection portion and when the respective signals both indicate abnormal values departing from predetermined ranges, it determines that the liquid body adheres to the sensor portion is disclosed. According to PTL 2, since a first signal and a second signal relating to the air flowrate, respectively, are obtained from the heater temperature control portion and the flowrate detection portion and adhesion of the liquid body to the sensor portion is determined on the basis of the two signals, accuracy of the determination is high, and it is considered that adhesion of the liquid body to the sensor can be determined with high possibility.

CITATION LIST

Patent Literatures

Patent Literature 1: Japanese Patent Application Laid-Open No. 2001-91323; and
Patent Literature 2: Japanese Patent Application Laid-Open No. 2012-207925.

SUMMARY OF THE INVENTION

Problems to be Solved by the Invention

With the purpose of energy-saving in an internal combustion engine, various technologies of lean combustion or stratified combustion have been examined/employed, but a demand for energy-saving has been intensified. In order to effectively realize combustion with a condition leaner than a stoichiometric air/fuel ratio such as lean combustion and stratified combustion, in addition to precise control of a fuel injection amount, highly accurate measurement of an air flowrate is indispensable. Thus, higher accuracy is in strong demand also for a thermal mass flowmeter.

In a thermal mass flowmeter, the easier a temperature change of a heating element by a gas flow is, the easier radiation can be detected in principle, and highly accurate measurement can be made. Thus, it is preferable that a heating temperature of the heating element is increased in order to make a temperature difference between the gas flow and the heating element larger or a resistance temperature factor of the heating element and a resistive element used for a temperature sensor disposed around it is increased so as to facilitate detection of the temperature change.

However, if the heating temperature of the heating element is increased, at a moment when a droplet adheres to the heating element, bumping of the droplet can easily occur, and possibility that the thermal flowmeter is broken by a high steam pressure at the bumping heightens. If the resistor temperature factor of the heating element/resistive element is increased, their electric resistance value rapidly drops at adhesion of the droplet, and put-in power to the heating element (that is, calorific value) rapidly increases and aids bumping and also causes a problem of easy thermal deterioration of the heating element.

The related-art technology described in Patent Literature 1 or 2 described above has an emphasis on prevention of thermal deterioration of the heating element and breakage of the thermal flowmeter by detecting adhesion of the droplets or the like to the sensor portion and by controlling the calorific value when the droplet adheres and thus, the demand for higher accuracy of the recent gas flowrate measurement is not considered to be sufficiently satisfied.

Moreover, if the calorific value is controlled by detecting adhesion of the droplet or the like to the sensor portion as in the related-art technologies, it is likely that control response cannot catch bumping at the moment of adhesion of the droplet in time. That is, in the thermal mass flowmeter, it has a problem exactly opposite to ensuring of high accuracy and reliability of measurement (prevention of deterioration and breakage caused by droplet adhesion, for example), and it has been difficult to realize the both.

The present invention was made in view of the aforementioned circumstances and has an object to provide a thermal mass flowmeter that makes higher accuracy of gas flowrate measurement possible while reliability of the thermal mass flowmeter is ensured (while deterioration and breakage caused by droplet adhesion are prevented).

Solution to Problems

An aspect of the present invention is a thermal mass flowmeter for measuring amass flowrate of a gas flow and provides a thermal mass flowmeter including:

a heating element for generating heat by conduction, a temperature detection bridge circuit for detecting a temperature of the heating element, and a sensor element driving circuit portion connected to the heating element and the temperature detection bridge circuit and executing conduction control to the heating element, in which the sensor element driving circuit portion has an output mechanism and an output impedance adjustment mechanism, and the output impedance adjustment mechanism is disposed between the output mechanism and the heating element and its output impedance is higher than an electric resistance value of the heating element and less than 1 MΩ.

Advantages of the Invention

According to the invention, a thermal mass flowmeter that makes higher accuracy of gas flowrate measurement possible while reliability in the thermal mass flowmeter is ensured (while deterioration or breakage caused by droplet adhesion is prevented) can be provided.

DETAILED DESCRIPTION OF THE PREFERRED EMBODIMENTS

Figure 1:
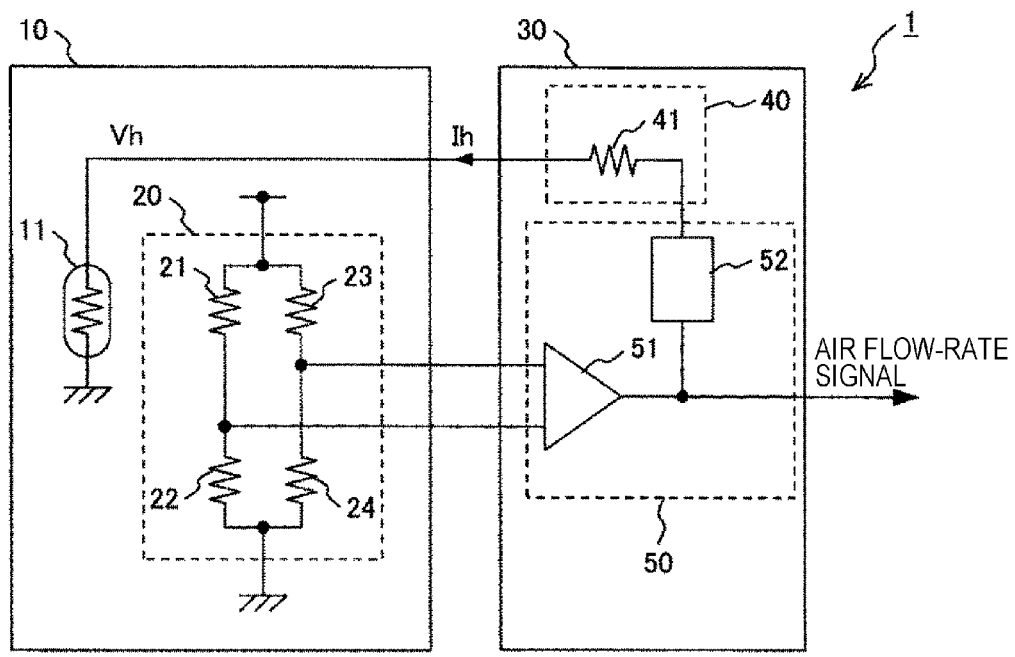
FIG. 1 is a schematic circuit diagram illustrating constitution of a thermal mass flowmeter of a first embodiment.

The present invention can apply improvement or change as follows in a thermal mass flowmeter according to the present invention described above.

(i) The conduction control is voltage control, and an impedance of the output mechanism is lower than an electric resistance value of the heating element and output impedance of the sensor element driving circuit portion is increased by the output impedance adjustment mechanism.

(ii) The output impedance adjustment mechanism is constituted by an electric resistor.

(iii) The conduction control is current control, and the impedance of the output mechanism is higher than the electric resistance value of the heating element, and the output impedance adjustment mechanism lowers the output impedance of the sensor element driving circuit portion.

(iv) The output mechanism has a current limit mechanism for limiting a current to the heating element.

(v) The output impedance adjustment mechanism is constituted by a current mirror circuit.

(vi) The output impedance adjustment mechanism further has an electric resistor that is disposed between the current mirror circuit and the heating element.

(vii) The output mechanism further has a current limit value adjustment mechanism for adjusting a current limit value by the current limit mechanism.

(viii) The sensor element portion further has a temperature difference detection bridge circuit for detecting a temperature difference between a gas-flow upstream side and a gas-flow downstream side of the heating element, and the output mechanism further has a second current limit mechanism for limiting a current to the heating element on the basis of an output from the temperature difference detection bridge circuit.

(ix) The sensor element driving circuit portion has a current output type digital-analog converter.

(x) The sensor element driving circuit portion further has an input limiter for limiting an input value to the current output type digital-analog converter.

(xi) The sensor element driving circuit portion further has a limiter adjustment mechanism for adjusting a limit value of the input limiter.

[Basic Idea of the Present Invention]

The inventors examined/considered a process in which a droplet adhering to the sensor portion goes bumping in detail in order to achieve the aforementioned object and keenly studied a measure against it. As a result, they found that an important point is how to suppress put-in power to the heating element (calorific value of the heating element) at a moment when the droplet adheres (a control mechanism for that). The present invention was completed on the basis of the finding. A thermal mass flowmeter of the present invention has a first feature in a sensor element driving circuit portion for executing conduction control of the sensor element portion.

An embodiment of the present invention will be described below by referring to the attached drawings. However, the present invention is not limited to the embodiment taken up here but is capable of appropriate combination or improvement within a range not departing from a technical idea of the invention. The same reference numerals are given to the same member/portion, and duplicated explanation will be omitted.

[First Embodiment of the Present Invention]

A thermal mass flowmeter of a first embodiment of the present invention will be described by referring to FIGS. 1 to 4.

FIG. 1 is a schematic circuit diagram illustrating constitution of the thermal mass flowmeter of the first embodiment. As illustrated in FIG. 1, the thermal mass flowmeter 1 of the first embodiment is constituted by a sensor element portion 10 having a heating element 11 generating heat by conduction and a temperature detection bridge circuit 20 for detecting a temperature of the heating element 11 and a sensor element driving circuit portion 30 connected to the sensor element portion 10 and executing conduction control to the heating element 11. The temperature detection bridge circuit 20 is constituted by a temperature detection resistor 21 whose electric resistance value changes in accordance with the temperature and fixed resistors 22 to 24 whose electric resistance values are constant.

The sensor element driving circuit portion 30 has an output mechanism 50 and an output impedance adjustment mechanism 40. The output mechanism 50 has am amplifier 51 for generating a driving voltage to the heating element 11 by detecting an output voltage of the temperature detection bridge circuit 20 and a current limit mechanism 52 for limiting a driving current of the heating element 11. The output impedance adjustment mechanism 40 is a mechanism disposed between the output mechanism 50 and the heating element 11 and adjusting the output impedance of the output mechanism 50 higher than the electric resistance value of the heating element 11 and less than 1 MΩ. A gas flowrate signal is constituted to be taken out of an output signal of the amplifier 51.

The thermal mass flowmeter 1 executes voltage control as conduction control to the heating element 11 due to its circuit constitution. Since the output impedance of the amplifier 51 is sufficiently small usually, adjustment in a direction to increase the output impedance of the sensor element driving circuit portion 30 by the output impedance adjustment mechanism 40 is performed. Specifically, the output impedance adjustment mechanism 40 in the first embodiment is preferably constituted by an electric resistor 41, and the output impedance of the sensor element driving circuit portion 30 is constituted to be substantially determined by that of the electric resistor 41.

Figure 2:
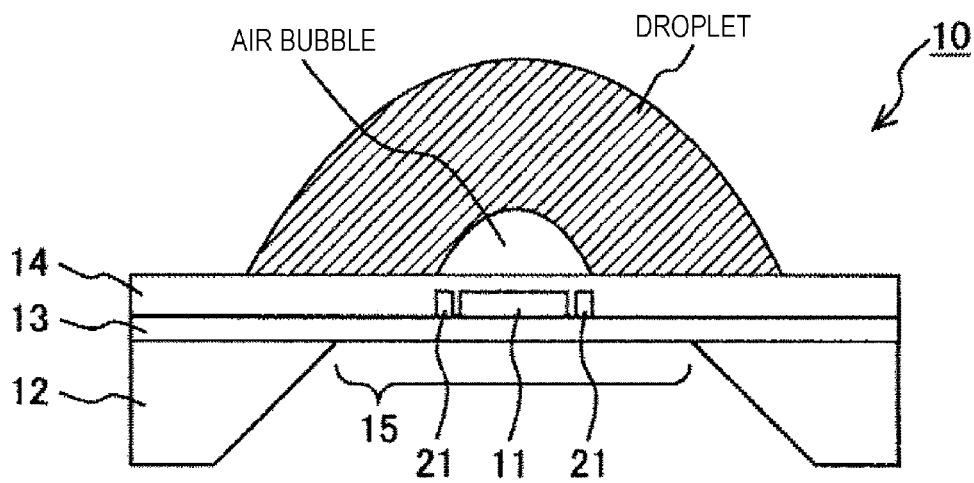
FIG. 2 is a sectional schematic view illustrating a structure example of a sensor element portion of the thermal mass flowmeter of the present invention.

FIG. 2 is a sectional schematic diagram illustrating a structure example of the sensor element portion of the thermal mass flowmeter of the present invention. In the figure, a droplet adhering to the sensor portion (the heating element 11 and the temperature detection resistor 21) and air bubbles generated by heat generation of the heating element 11 are also illustrated. As illustrated in FIG. 2, the sensor element portion 10 has a structure in which a first insulating film 13 is laminated on a silicon substrate 12, a sensor portion (the heating element 11 and the temperature detection resistor 21) is formed on the first insulating film 13, a second insulating film 14 is laminated so as to cover the sensor portion and the first insulating film 13, the silicon substrate 12 immediately below the sensor portion is removed, and a thin-film state sensor region 15 is formed. By making the sensor region 15 in a thin film state, such an advantage is obtained that a heat capacity is made smaller, and sensitivity/accuracy to a temperature change is improved, but it also has a disadvantage that mechanical strength is lowered.

When a droplet adheres to the sensor region 15, a temperature of the droplet is raised by heat of the heating element 11. At this time, if heating is slow, convection occurs in the droplet, and evaporation occurs from the surface of the droplet. When heating is intensified to some degree, air bubbles are generated inside the droplet. When heating is further intensified, generation/growth of the air bubbles occurs explosively, which causes bumping. At the bumping, a steam pressure is extremely high and makes a factor of rupture of the thin-film state sensor region 15. Thus, bumping is a phenomenon which should be strictly avoided.

As described above, in the thermal mass flowmeter, in order to make highly accurate measurement possible, a resistance temperature factor of the temperature detection resistor 21 is preferably high. For manufacturing cost reduction, the heating element 11 and the temperature detection resistor 21 are preferably constituted by the same material. From these facts, the thermal mass flowmeter of the present invention is constituted such that the heating element 11 and the temperature detection resistor 21 both have large positive resistance temperature factors. Since the thermal mass flowmeter 1 of this embodiment has the output impedance adjustment mechanism 40 (electric resistor 41) and the current limit mechanism 52, even if the resistance temperature factors of the heating element 11 and the temperature detection resistor 21 are increased, overheat of the heating element 11 can be suppressed, and bumping can be prevented against adhesion of droplets and the like (details will be described later).

Subsequently, a working effect of this embodiment will be described. The thermal mass flowmeter 1 detects the temperature of the heating element 11 by the temperature detection bridge circuit 20 in normal time (a state with no droplet adhesion, for example) and applies a voltage to the heating element 11 by the amplifier 51 so that an output of the temperature detection bridge circuit 20 becomes zero. By constituting as above, control works so that the heating temperature of the heating element 11 becomes constant. Since a radiation amount from the heating element 11 to the gas flow changes in accordance with the gas flowrate and the heating temperature, by controlling the heating temperature constant, the radiation amount to the gas flow becomes to change in accordance with the gas flow. In other words, since the heating temperature of the heating element 11 is controlled constant, the radiation amount to the gas flow and the calorific value of the heating element 11 (that is, the put-in power) are balanced well. As a result, an output according to the gas flowrate can be obtained from the output voltage of the amplifier 51.

Figure 3:
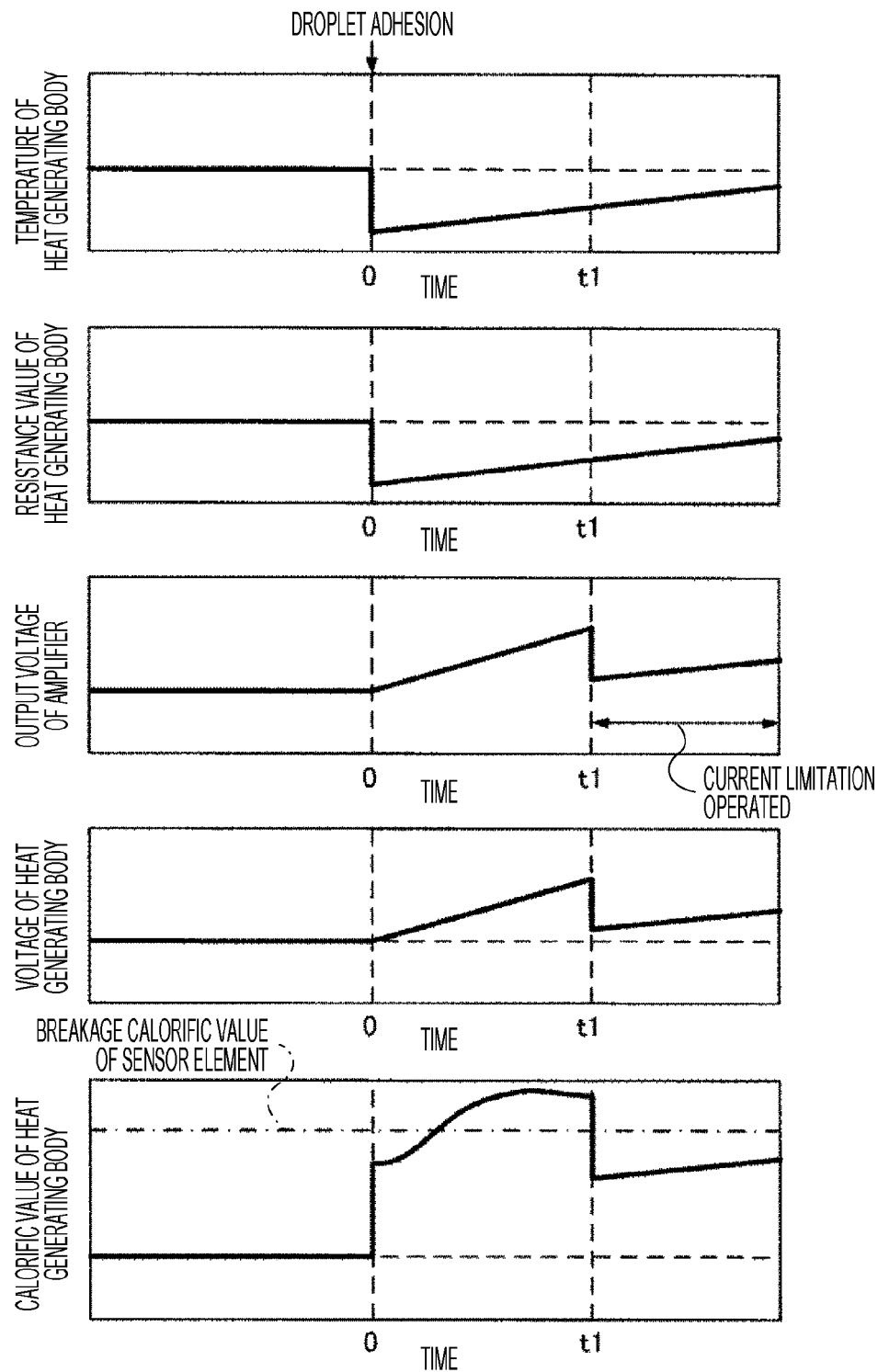
FIG. 3 is a waveform illustrating behavior of a heating element when a droplet adheres to a sensor portion in a related-art thermal mass flowmeter not having an output impedance adjustment mechanism.

FIG. 3 is a waveform illustrating behavior of the heating element when the droplet adheres to a sensor portion in a related-art thermal mass flowmeter not having an output impedance adjustment mechanism. Here, assume that the droplet adhesion occurs at "time=0" in FIG. 3. As illustrated in FIG. 3, before the droplet adhesion of "time<0", the temperature of the heating element 11, the electric resistance value of the heating element 11, the output voltage of the amplifier 51, the voltage of the heating element 11, and the calorific value of the heating element 11 are balanced in a predetermined state. In the case not having the output impedance adjustment mechanism, the output voltage of the amplifier 51 and the voltage of the heating element 11 are equal.

In this state, assume that the droplet adheres at the "time=0". The temperature of the heating element 11 is rapidly cooled by the droplet adhesion, and the resistance value of the heating element 11 is reduced by the large resistance temperature factor of the heating element 11. On the other hand, upon detection of the temperature drop of the heating element 11 by the temperature detection bridge circuit 20, the output voltage of the amplifier 51 begins to rise. As a result, the calorific value of the heating element 11 rapidly increases by the reduction of the resistance value of the heating element 11 and an increase of the output voltage of the amplifier 51 into the overheat state which would cause rupture of the sensor region 15 by thermal deterioration or bumping of the heating element (in other words, exceeds a sensor element breakage calorific value), and a possibility that the sensor element portion 10 is broken becomes higher.

If the conduction current of the heating element 11 is increased by the reduced resistance of the heating element 11 by the droplet adhesion and exceeds a predetermined threshold value, it is considered that the current limit mechanism 52 is operated and limits the current to the heating element 11 so as to suppress the calorific value of the heating element 11. However, the reduced resistance of the heating element 11 caused by the droplet adhesion and the rapid increase of the calorific value by that occur at a speed higher than an operation in an electronic circuit manner as in the current limit mechanism. 52, and it is likely that the current limitation by the current limit mechanism 52 cannot catch it in time. Particularly if the current detection accuracy is improved, the operation speed of the current limit mechanism 52 is further slowed. Thus, in FIG. 3, the current limit mechanism 52 is operated at the "time=t1". As described above, it is considered to be difficult for the related-art thermal mass flowmeter not having the output impedance adjustment mechanism to respond to the rapid rise of the calorific value of the heating element 11 immediately after the droplet adhesion only with the current limit mechanism 52.

Figure 4:
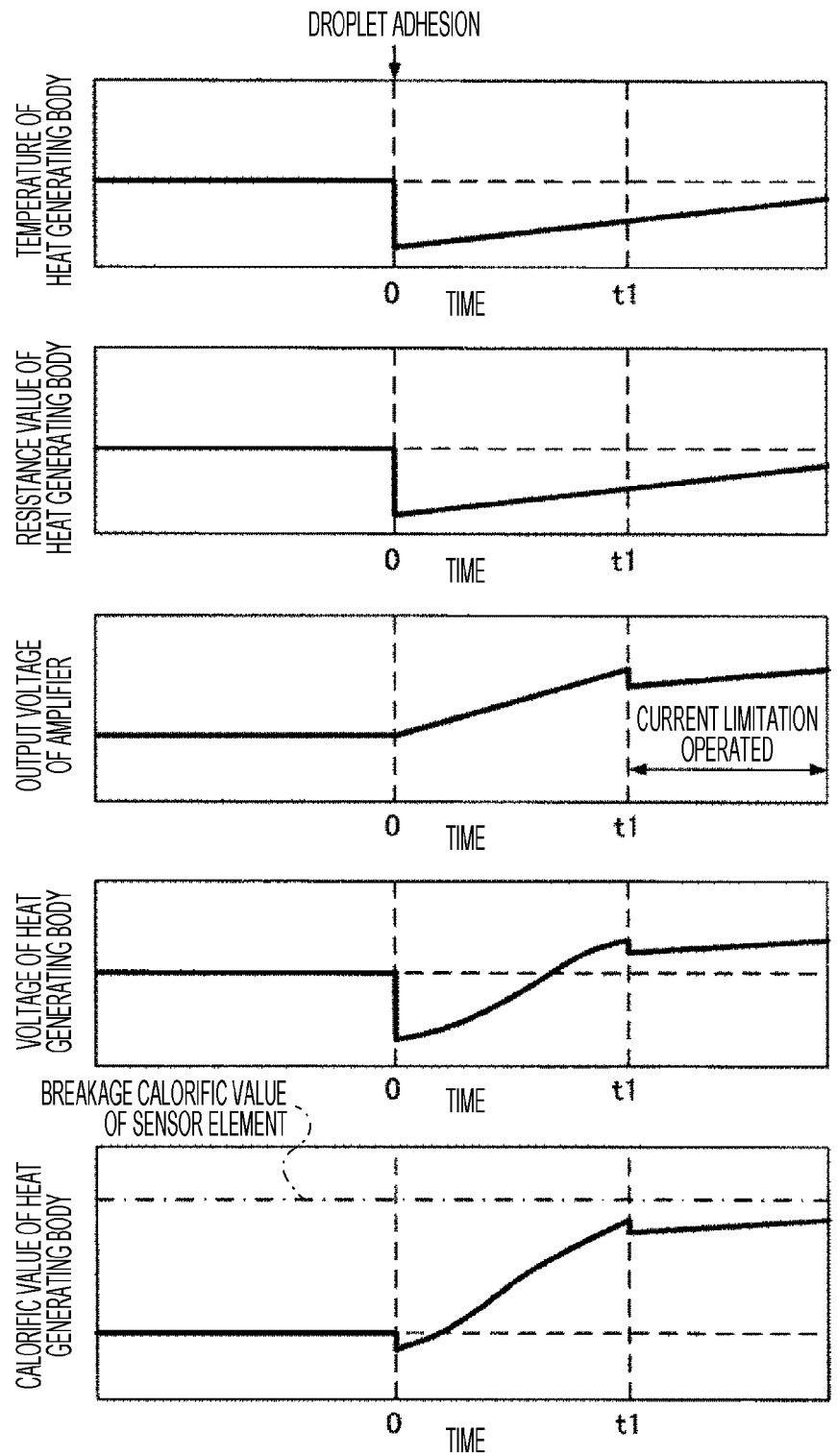
FIG. 4 is a waveform illustrating behavior of the heating element when the droplet adheres to the sensor portion in the thermal mass flowmeter of the first embodiment.

FIG. 4 is a waveform illustrating behavior of the heating element when the droplet adheres to the sensor portion in the thermal mass flowmeter of the first embodiment. Similarly to FIG. 3, assume that the droplet adhesion occurs at the "time=0" in FIG. 4, too. As illustrated in FIG. 4, before the droplet adhesion of the "time<0", the temperature of the heating element 11, the electric resistance value of the heating element 11, the output voltage of the amplifier 51, the voltage of the heating element 11, and the calorific value of the heating element 11 are balanced in the predetermined state. If the output impedance adjustment mechanism 40 is provided, the voltage of the heating element 11 has a value obtained by dividing the output voltage of the amplifier 51 by the resistance value of the heating element 11 and the resistance value of the electric resistor 41.

In this state, assume that the droplet adheres at the "time=0". The temperature of the heating element 11 is rapidly cooled by the droplet adhesion, the resistance value of the heating element 11 is lowered, and the output voltage of the amplifier 51 begins to rise by the temperature drop of the heating element 11 similarly to FIG. 3. Here, since the voltage of the heating element 11 is a divided voltage with the resistance value of the electric resistor 41, it is reduced at the "time=0" as the resistance value of the heating element 11 decreases. As a result, the calorific value of the heating element 11 increases with the increase in the output voltage of the amplifier 51, but since there is no rapid increase in the calorific value at the "time=0", it does not exceed the sensor element breakage calorific value immediately (in other words, time until it exceeds the sensor element breakage calorific value can be extended). Moreover, at "time=t1", the current limit mechanism 52 is operated and limits the current to the heating element 11 so that the calorific value of the heating element 11 can be suppressed. By means of such mechanism, the thermal mass flowmeter 1 of this embodiment can prevent rupture of the sensor region 15 caused by thermal deterioration or bumping of the heating element 11. In order to obtain this working effect, the output impedance by the output impedance adjustment mechanism 40 (resistance value of the electric resistor 41) is preferably higher at least than the electric resistance value of the heating element 11. If the output impedance by the output impedance adjustment mechanism 40 becomes 1 MΩ or more, the divided voltage of the heating element 11 becomes too small and temperature control of the heating element 11 becomes difficult.

[Second Embodiment of the Present Invention]

A thermal mass flowmeter of a second embodiment of the present invention will be described by referring to FIGS. 5 to 11.

Figure 5:
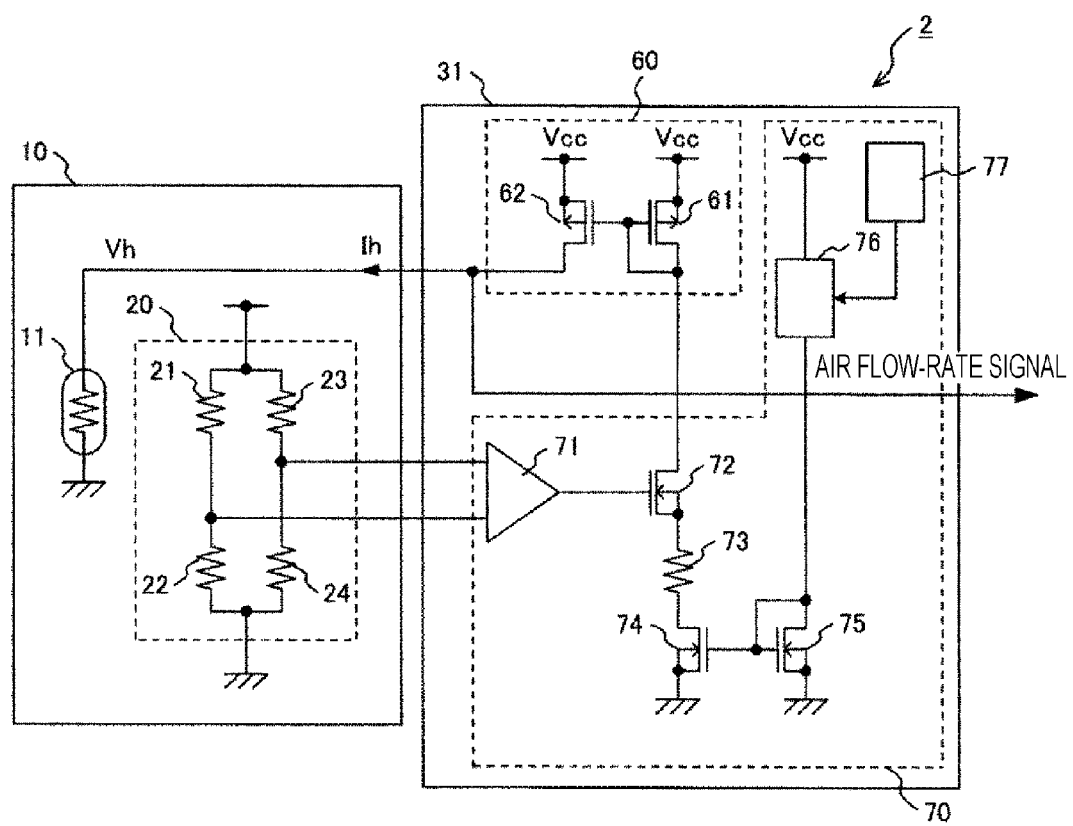
FIG. 5 is a schematic circuit diagram illustrating constitution of a thermal mass flowmeter of a second embodiment.

FIG. 5 is a schematic circuit diagram illustrating constitution of the thermal mass flowmeter of the second embodiment. As illustrated in FIG. 5, in a thermal mass flowmeter 2 of the second embodiment, a sensor element portion 10 has the same constitution as that of the thermal mass flowmeter 1 of the first embodiment, but the sensor element driving circuit portion 31 has different constitution. A sensor element driving circuit portion 31 of this embodiment has an output mechanism 70 and an output impedance adjustment mechanism 60.

The output mechanism. 70 has an amplifier 71 for detecting an output voltage of the temperature detection bridge circuit 20, a MOS transistor 72 receiving an output of the amplifier 71, an electric resistor 73 and a MOS transistor 74 connected in series to the MOS transistor 72, a MOS transistor 75 constituting a current mirror circuit together with the MOS transistor 74, a constant current source 76 connected to the MOS transistor 75 and generating a predetermined current, and a current limit mechanism 77 connected to the constant current source 76 and limiting a maximum current of the output mechanism 70 (that is, limiting a driving current of the heating element 11). The output impedance adjustment mechanism 60 has a MOS transistor 61 connected to the MOS transistor 72 and a MOS transistor 62 constituting a current mirror circuit together with the MOS transistor 61. A gas flowrate signal is configured to be taken out of the driving voltage of the heating element 11.

Figure 6:
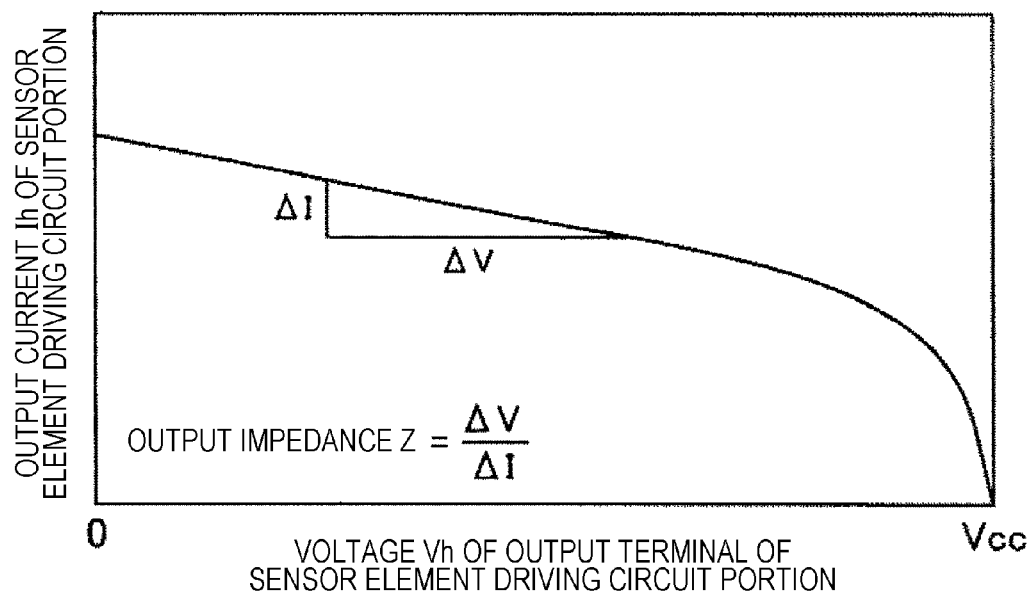
FIG. 6 is a graph illustrating a schematic relation between an output current and an output voltage of the output mechanism in the thermal mass flowmeter of the second embodiment.

The thermal mass flowmeter 2 executes current control as conduction control to the heating element 11 due to its circuit constitution. Here, output characteristics of the output mechanism 70 are illustrated in FIG. 6. FIG. 6 is a graph illustrating a schematic relation between an output current and an output voltage of the output mechanism in the thermal mass flowmeter of the second embodiment. Since the output mechanism 70 is constituted by a current mirror circuit of the MOS transistor 74 and the MOS transistor 75, output impedance is extremely high and mounts to a level of several MΩ. Thus, in this embodiment, adjustment is made so that the output impedance becomes several 100 kΩ by reducing gate lengths of the MOS transistor 61 and the MOS transistor 62 in the output impedance adjustment mechanism 60, respectively. That is, adjustment in a direction to lower the output impedance of the sensor element driving circuit portion 31 is made by the output impedance adjustment mechanism 60.

Figure 7:
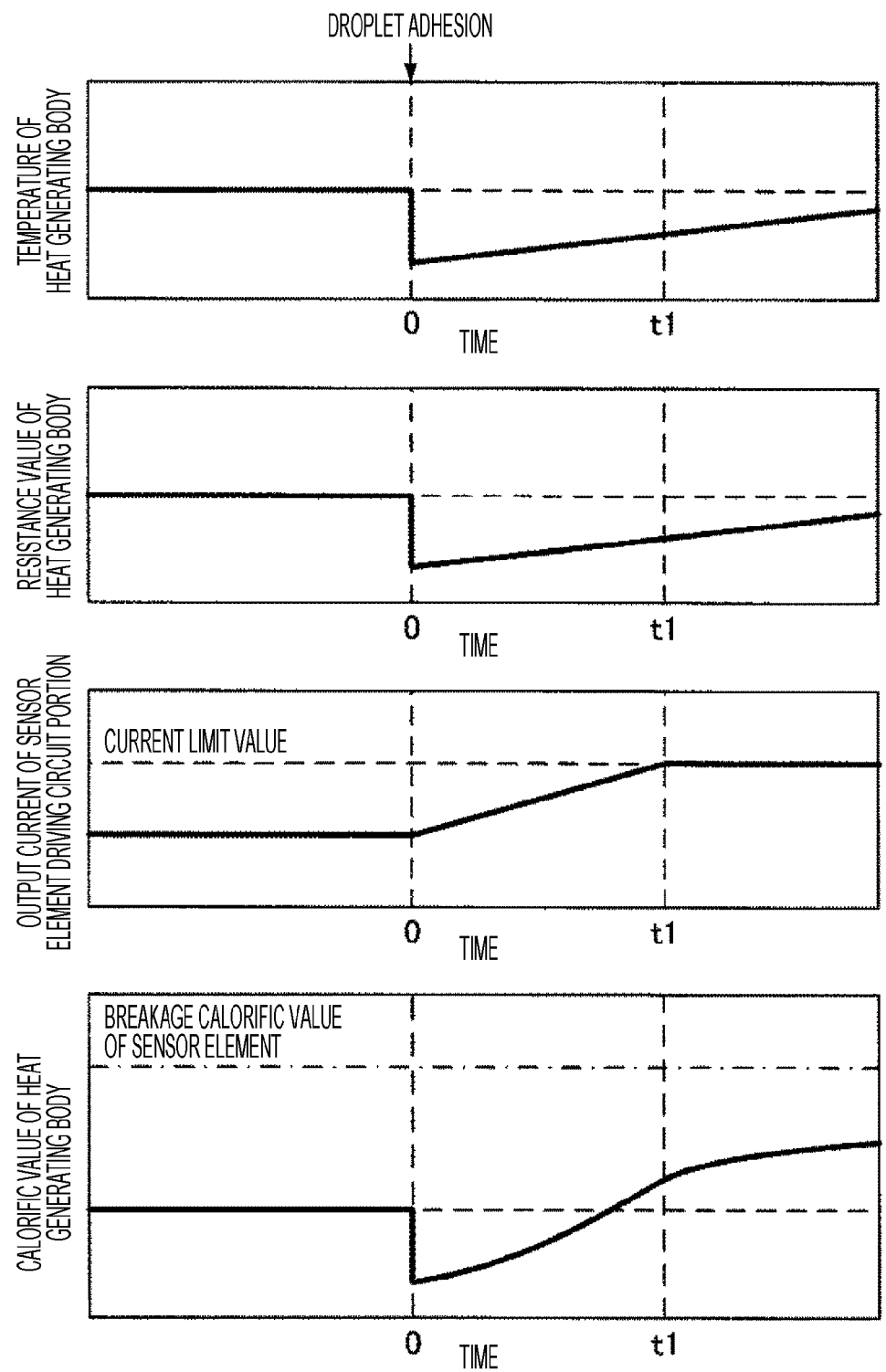
FIG. 7 is a waveform illustrating behavior of the heating element when the droplet adheres to the sensor portion in the thermal mass flowmeter of the second embodiment.

Subsequently, a working effect of this embodiment will be described. FIG. 7 is a waveform illustrating behavior of the heating element when a droplet adheres to the sensor portion in the thermal mass flowmeter of the second embodiment. Here, in FIG. 7, assume that droplet adhesion occurs at the "time=0". As illustrated in FIG. 7, before the droplet adhesion of the "time<0", the temperature of the heating element 11, the electric resistance value of the heating element 11, an output current of the sensor element driving circuit 31, and the calorific value of the heating element 11 are balanced in the predetermined state.

In this state, assume that the droplet adheres at the "time=0". The temperature of the heating element 11 is rapidly cooled by the droplet adhesion, the resistance value of the heating element 11 is reduced, and the output current of the sensor element driving circuit portion 31 begins to rise by an operation of the driving circuit. Here, since the resistance value of the heating element 11 is reduced, the calorific value of the heating element 11 is rapidly lowered immediately after the droplet adhesion. As a result, the calorific value of the heating element 11 increases with an increase in the output current of the sensor element driving circuit portion 31 but since there is no rapid increase of the calorific value at the "time=0", it does not exceed the sensor element breakage calorific value immediately (in other words, time until it exceeds the sensor element breakage calorific value can be extended). Moreover, at the "time=t1", the output current of the sensor element driving circuit portion 31 reaches a current limit value and becomes constant, whereby an increase of the calorific value of the heating element 11 is suppressed (increase of the calorific value becomes gentler). By means of such mechanism, the thermal mass flowmeter 2 of this embodiment can prevent rupture of the sensor region 15 caused by thermal deterioration or bumping of the heating element 11.

Figure 8:
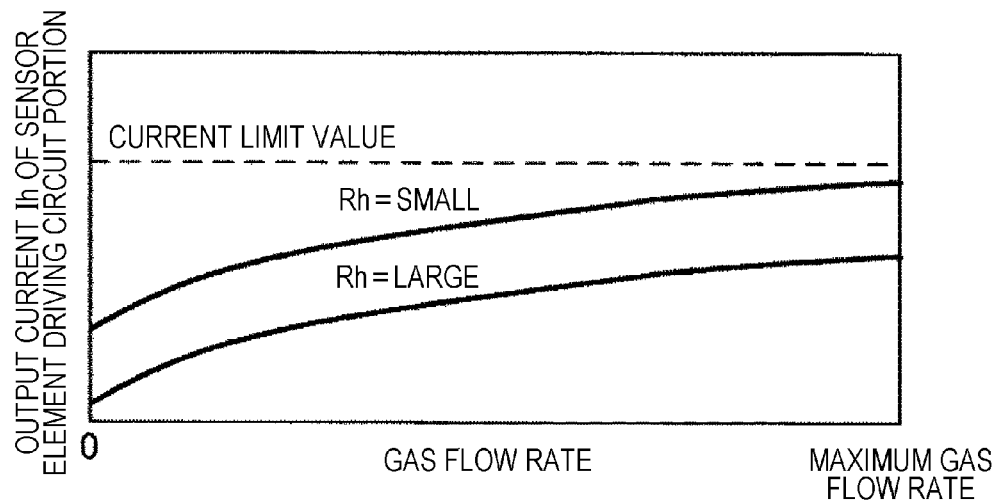
FIG. 8 is a graph illustrating a schematic relation between the output current and the gas flowrate of a sensor element driving circuit portion in the thermal mass flowmeter of the second embodiment.

Subsequently, a limit value of the output current of the sensor element driving circuit portion 31 will be described. FIG. 8 is a graph illustrating a schematic relation between the output current and the gas flowrate of the sensor element driving circuit portion in the thermal mass flowmeter of the second embodiment. FIG. 8 illustrates a relation when there is no droplet adhesion (normal time). As illustrated in FIG. 8, the output current of the sensor element driving circuit portion 31 also increases in accordance with an increase of the gas flowrate, but the sensor element driving circuit portion 31 needs to allow the required output current to flow at least at the maximum gas flowrate. Moreover, the output current of the sensor element driving circuit portion 31 changes in accordance with an electric resistance value Rh of the heating element 11. On the other hand, when the droplet adheres to the sensor portion, as described above, in order to prevent rupture of the sensor region 15 caused by thermal deterioration or bumping of the heating element 11, the driving current needs to be limited so as to suppress the calorific value of the heating element 11. From these facts, the thermal mass flowmeter 2 of this embodiment can handle the heating element 11 with different electric resistance value Rh by providing the current limit mechanism 77 in the sensor element driving circuit portion 31.

Figure 9:
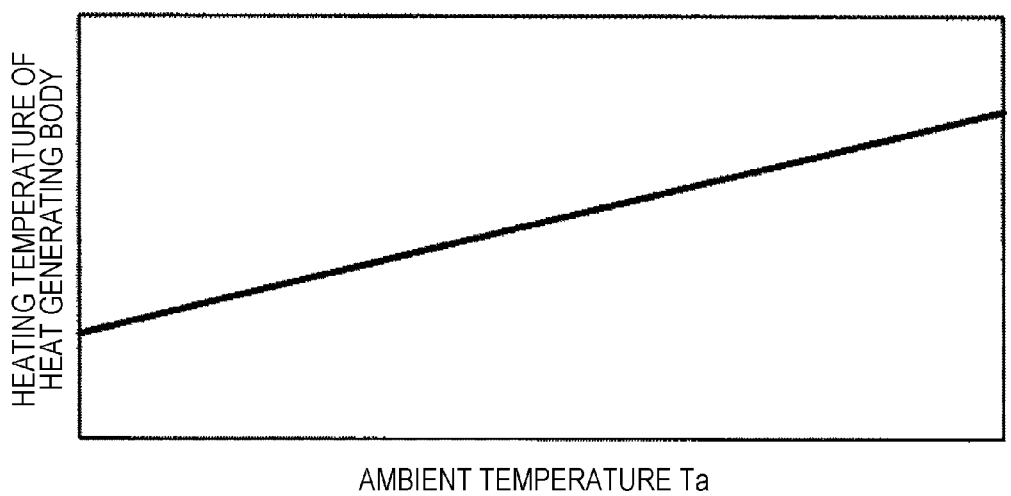
FIG. 9 is a graph illustrating a schematic relation between a heating temperature and an ambient temperature of the heating element.
Figure 10:
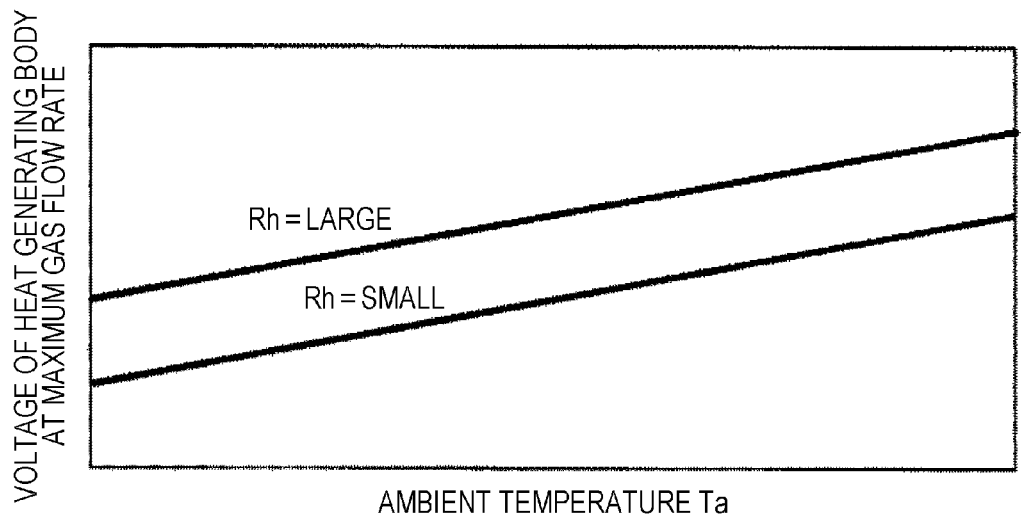
FIG. 10 is a graph illustrating a schematic relation between a voltage and the ambient temperature of the heating element at a maximum gas flowrate.
Figure 11:
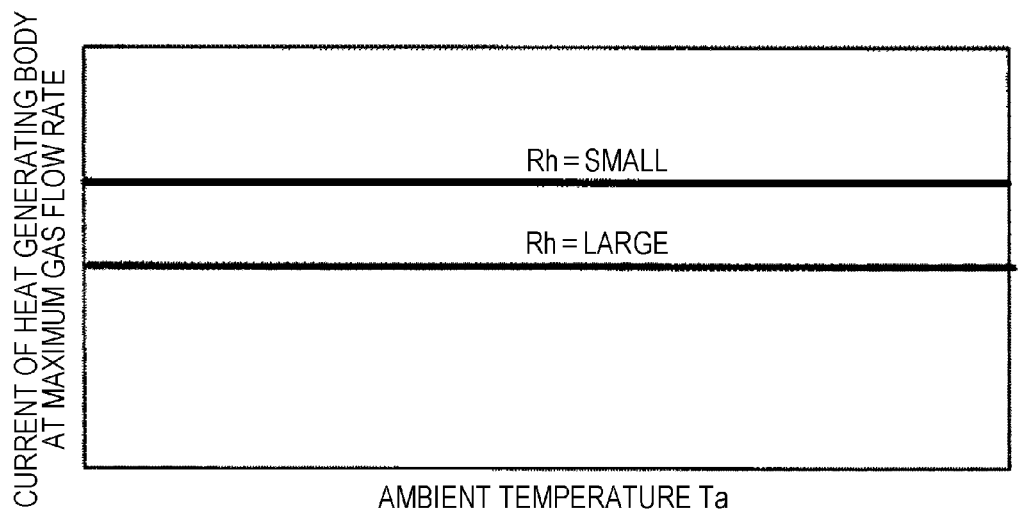
FIG. 11 is a graph illustrating a schematic relation between a current and the ambient temperature of the heating element at the maximum gas flowrate.

Subsequently, advantages of using the current control for power limitation of the heating element 11 will be described in brief. FIG. 9 is a graph illustrating a schematic relation between the heating temperature and an ambient temperature of the heating element. FIG. 10 is a graph illustrating a schematic relation between the voltage and the ambient temperature of the heating element at the maximum gas flowrate. FIG. 11 is a graph illustrating a schematic relation between a current and the ambient temperature of the heating element at the maximum gas flowrate.

As an example, it is assumed that the fixed resistors 22 to 24 of the temperature detection bridge circuit 20 are constituted by the same material as that of the temperature detection resistor 21 or the heating element 11. In this case, similarly to the temperature detection resistor 21 or the heating element 11, the fixed resistors 22 to 24 also have large positive resistance temperature factors. As a result, since the electric resistance values of the fixed resistors 22 to 24 are changed by the ambient temperature, the heating temperature of the heating element 11 rises in accordance with a rise of the ambient temperature (see FIG. 9). This phenomenon more remarkably appears when the resistance temperature factor of the heating element or the resistor becomes larger. At this time, the voltage of the heating element 11 at the maximum gas flowrate changes largely in accordance with the ambient temperature as illustrated in FIG. 10. On the other hand, in the current of the heating element 11 at the maximum gas flowrate, as illustrated in FIG. 11, though a difference according to the electric resistance value Rh of the heating element 11 is generated, it is not influenced by the ambient temperature but is constant. As is known from these facts, the power limitation of the heating element 11 is realized more easily by the current limitation not influenced by the ambient temperature than by the voltage limitation.

[Third Embodiment of the Present Invention]

A thermal mass flowmeter of a third embodiment of the present invention will be described by referring to FIG. 12.

Figure 12:
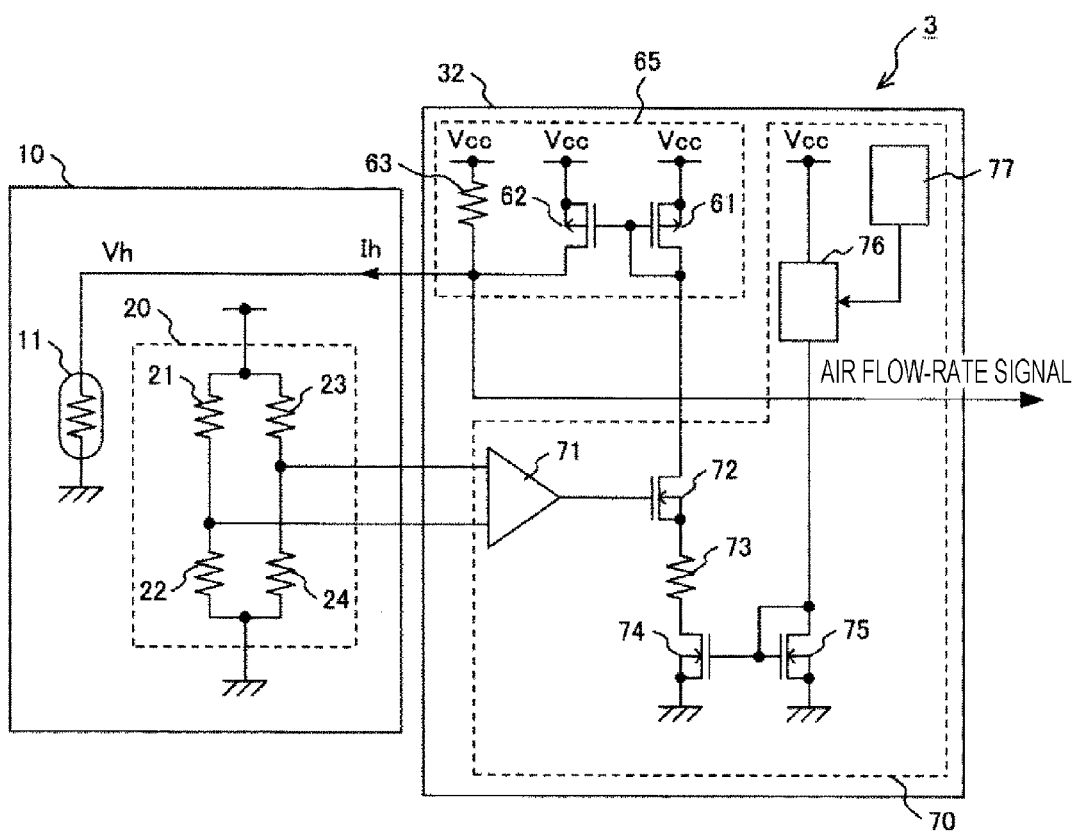
FIG. 12 is a schematic circuit diagram illustrating constitution of a thermal mass flowmeter of a third embodiment.

FIG. 12 is a schematic circuit diagram illustrating constitution of the thermal mass flowmeter of the third embodiment. As illustrated in FIG. 12, a thermal mass flowmeter 3 of the third embodiment has a sensor element portion 10 and a sensor element driving circuit portion 32, and the sensor element driving circuit portion 32 has the output mechanism 70 and an output impedance adjustment mechanism 65. That is, the thermal mass flowmeter 3 of the third embodiment is different from the thermal mass flowmeter 2 of the second embodiment in the output impedance adjustment mechanism 65.

The output impedance adjustment mechanism 65 is different from the output impedance adjustment mechanism 60 in a point that an electric resistor 63 is disposed on a rear stage of the MOS transistor 62 and has an advantage that the output impedance of the sensor element driving circuit portion 32 is made further lower than the output impedance of the sensor element driving circuit portion 31 so as to improve temperature stability of the heating element 11.

If the heating element 11 which is a resistance heating element having a positive resistance temperature factor is to be controlled at a constant temperature, temperature stability becomes higher when being driven at a lower impedance. That is because the heating element 11 is driven at a constant voltage even if its electric resistance value is changed. Describing in more detail, when the temperature of the heating element 11 rises and the electric resistance value of the heating element 11 increases, if the driving circuit of the heating element 11 has a low impedance (constant voltage), the current of the heating element 11 decreases, and the calorific value of the heating element 11 lowers (the temperature of the heating element 11 drops). That is, control (negative feedback) to make the temperature constant by the resistance change of the heating element 11 itself works.

On the other hand, when the heating element 11 is driven by the driving circuit with a high impedance, the temperature of the heating element 11 rises and the electric resistance value of the heating element 11 increases and moreover, the voltage of the heating element 11 increases and thus, the calorific value of the heating element 11 further increases (the temperature of the heating element 11 further rises). As a result, positive feedback works on temperature control by the resistance change of the heating element 11 itself, and instability increases. Since this phenomenon of positive feedback is remarkable if the output impedance of the driving circuit becomes 1 MΩ or more, the output impedance of the sensor element driving circuit portion is preferably adjusted to less than 1 MΩ (several 100 KΩ or less, for example) by the output impedance adjustment mechanism.

In addition, since the output impedance adjustment mechanism 65 can supply a part of put-in current to the heating element 11 by the electric resistor 63 by disposing the electric resistor 63, the current value of the MOS transistor 62 can be made smaller, and there is an advantage that the size of the MOS transistor 62 can be reduced.

[Fourth Embodiment of the Present Invention]

A thermal mass flowmeter of a fourth embodiment of the present invention will be described by referring to FIGS. 13 and 14.

Figure 13:
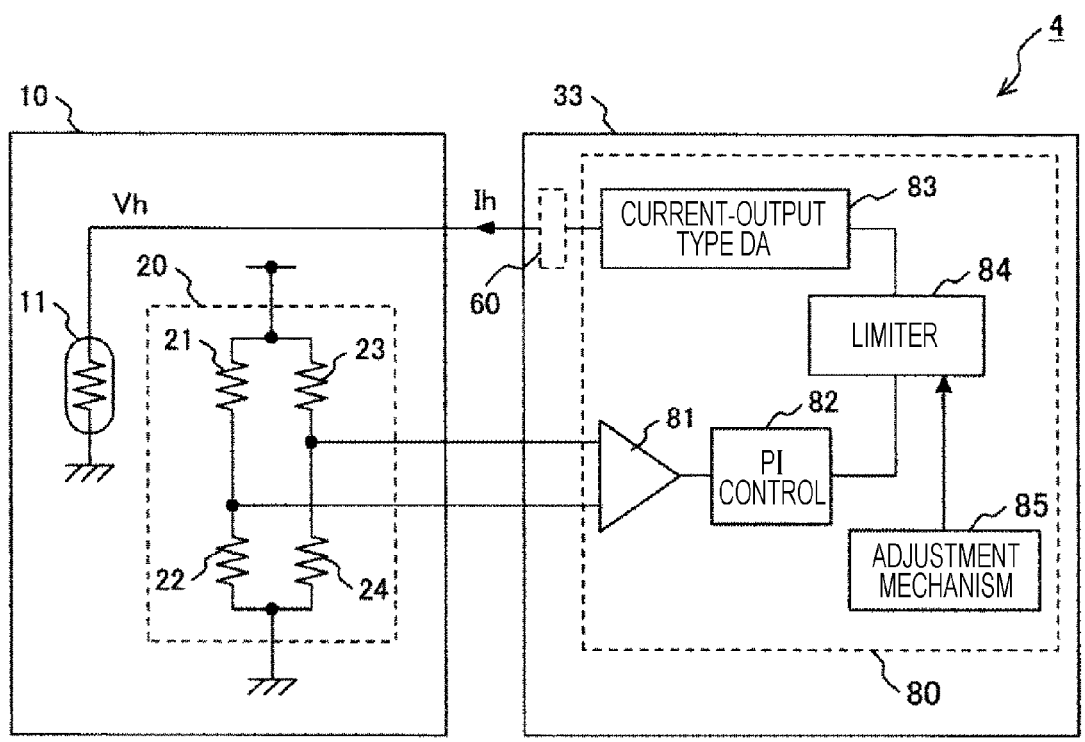
FIG. 13 is a schematic circuit diagram illustrating constitution of a thermal mass flowmeter of a fourth embodiment.

FIG. 13 is a schematic circuit diagram illustrating constitution of the thermal mass flowmeter of the fourth embodiment. As illustrated in FIG. 13, a thermal mass flowmeter 4 of the fourth embodiment has a sensor element portion 10 and a sensor element driving circuit portion 33, and the sensor element driving circuit portion 33 has an output mechanism 80 and the output impedance adjustment mechanism 60. That is, the thermal mass flowmeter 4 of the fourth embodiment is different from the thermal mass flowmeter 2 of the second embodiment in the output mechanism 80.

The output mechanism 80 of this embodiment has a comparator 81 for detecting an output voltage of the temperature detection bridge circuit 20, a PI controller 82 for executing proportional-integral control (PI control) from an output of the comparator 81, a current output type digital-analog (DA) converter 83 for controlling conduction to the heating element 11, an input limiter 84 for limiting a maximum value of an input signal to the current output type DA converter 83, and a limiter adjustment mechanism 85 for adjusting a limit value of the input limiter 84.

Figure 14:
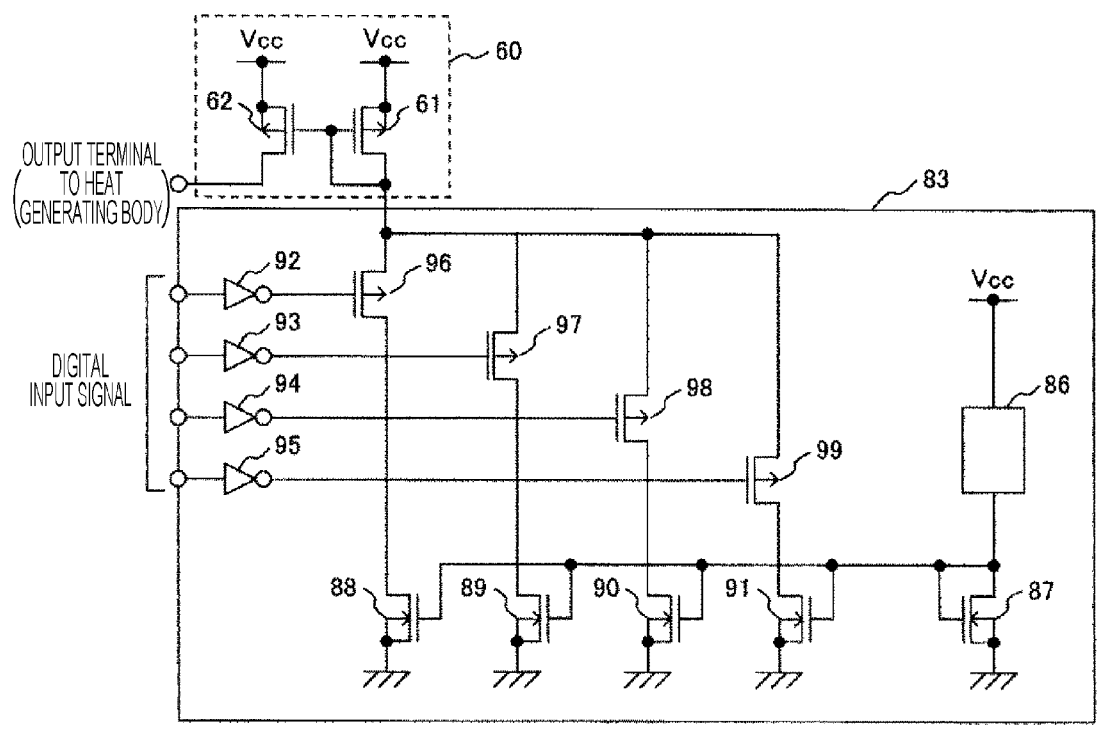
FIG. 14 is a schematic circuit diagram illustrating a constitutional example of a current output type DA converter used in the fourth embodiment.

FIG. 14 is a schematic circuit diagram illustrating a constitutional example of the current output type DA converter used in the fourth embodiment. As illustrated in FIG. 14, the current output type DA converter 83 has a constant current source 86 generating a predetermined current, a MOS transistor 87 allowing a current of the constant current source 86 to flow, MOS transistors 88 to 91 constituting the current mirror circuit together with the MOS transistor 87 and having a ratio of gate widths of "1:2:4:8", inverters 92 to 95 receiving digital input signals, and MOS transistors 96 to 99 by turning itself on/off in accordance with outputs of the inverters 92 to 95 so as to turn on/off currents of the MOS transistors 88 to 91 constituting the current mirror circuit, respectively. The current controlled by the current output type DA converter 83 is put into the MOS transistor 61 of the output impedance adjustment mechanism 60.

In the thermal mass flowmeter 4 of this embodiment, an output voltage of the temperature detection bridge circuit 20 is detected by the comparator 81, an output of the comparator 81 is PI-calculated by the PI controller 82, and the current output type DA converter 83 is controlled through the input limiter 84 limiting a maximum value of a signal of a calculation result so that a current value to the heating element 11 is controlled (a heating temperature of the heating element 11 is controlled). That is, this embodiment is made capable of easy control of a maximum current to the heating element 11 by employing the input limiter 84 and the current output type DA converter 83. It is also constituted such that the maximum current to the heating element 11 can be easily set by adjusting a limit value of the input limiter 84 by the limiter adjustment mechanism 85.

[Fifth Embodiment of the Present Invention]

Figure 16:
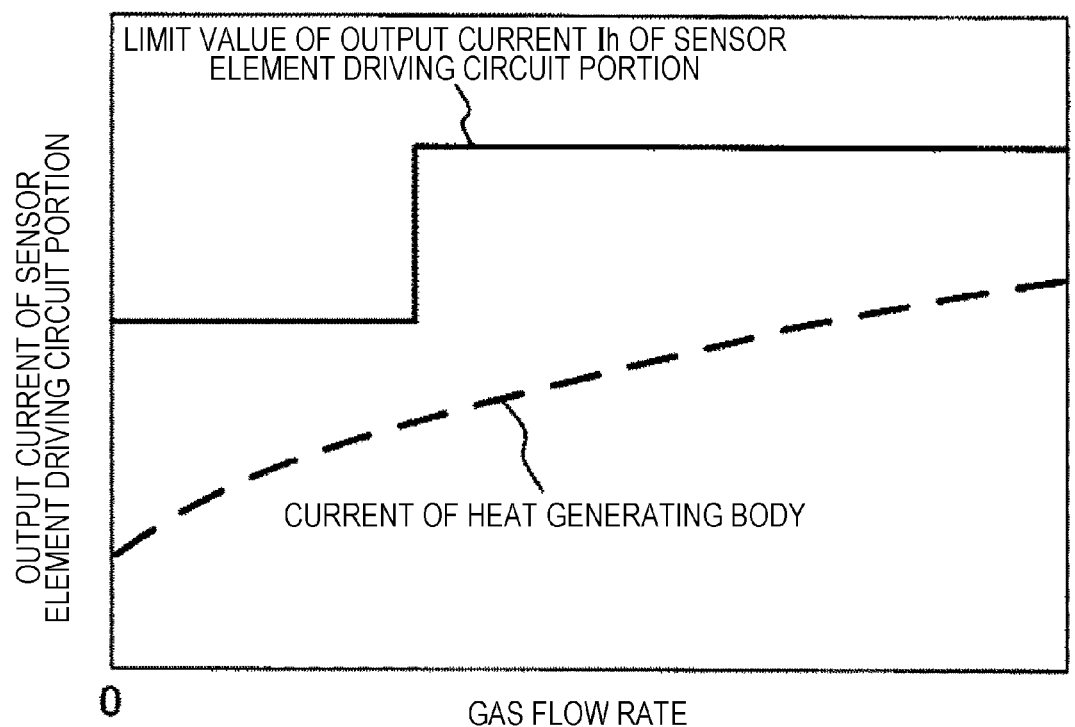
FIG. 16 is a graph illustrating a schematic relation between an output current and a gas flowrate of a sensor element driving circuit portion in the thermal mass flowmeter of the fifth embodiment.

A thermal mass flowmeter of a fifth embodiment of the present invention will be described by referring to FIGS. 16 to 17.

Figure 15:
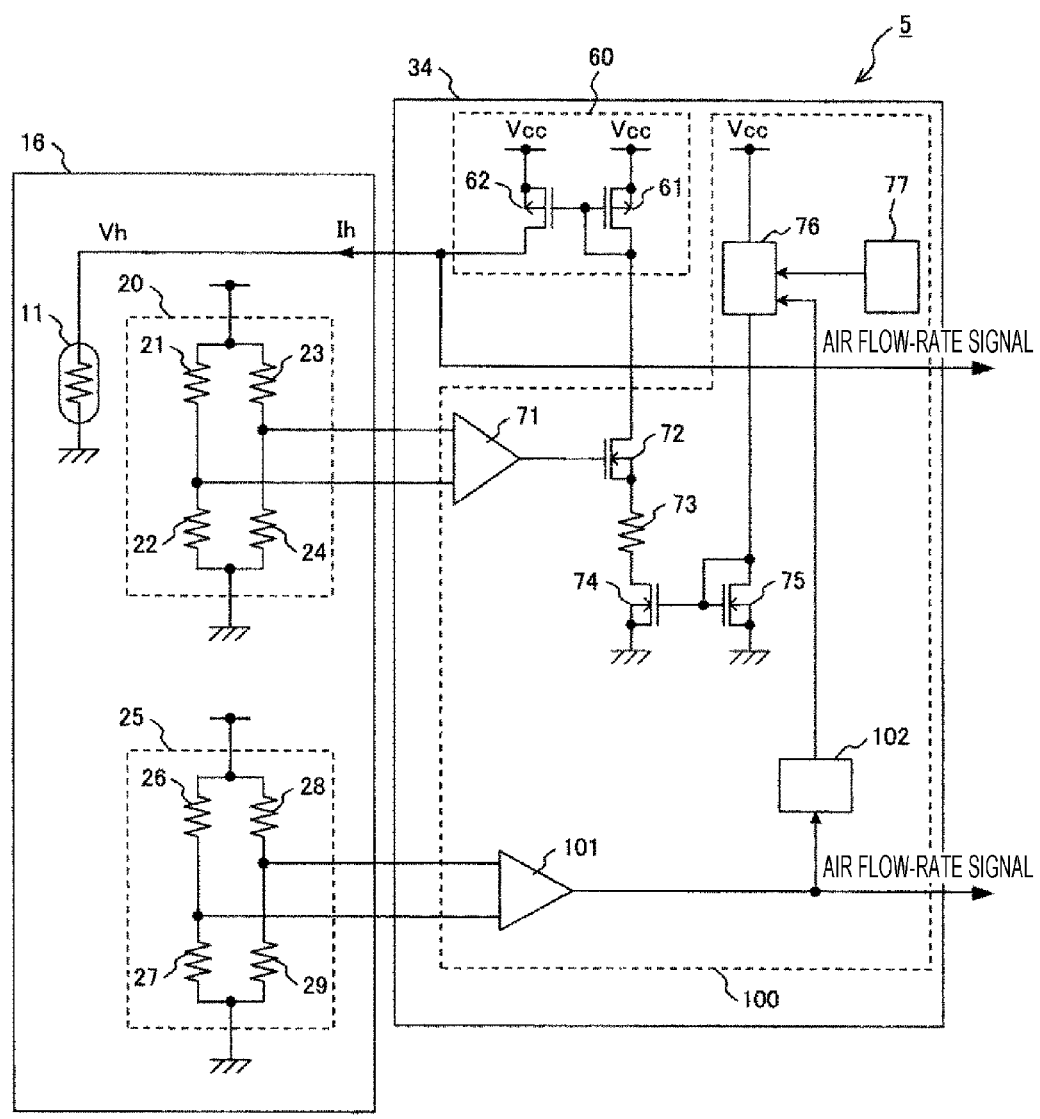
FIG. 15 is a schematic circuit diagram illustrating constitution of a thermal mass flowmeter of a fifth embodiment.

FIG. 15 is a schematic circuit diagram illustrating constitution of a thermal mass flowmeter of the fifth embodiment. As illustrated in FIG. 15, a thermal mass flowmeter 5 of the fifth embodiment has a sensor element portion 16 and a sensor element driving circuit portion 34. The thermal mass flowmeter 5 of this embodiment has constitution basically similar to the thermal mass flowmeter 2 of the second embodiment but the following improvement is added.

The sensor element portion 16 has a temperature difference detection bridge circuit 25 added to the constitution of the sensor element portion 10. The temperature difference detection bridge circuit 25 is constituted by upwind temperature detection resistors 26 and 29 arranged on an upwind side (upstream side of the gas flow) of the heating element 11, and downwind temperature detection resistors 27 and 28 arranged on a downwind side (downstream side of the gas flow) of the heating element 11. An output mechanism 100 of the sensor element driving circuit portion 34 has an amplifier 101 for generating a gas flowrate signal by amplifying an output of the temperature difference detection bridge circuit 25 and a second current limit mechanism 102 for limiting a maximum current of the constant current source 76 in accordance with an output of the amplifier 101 in addition to the constitution of the output mechanism 70.

Subsequently, a working effect of this embodiment will be described. FIG. 16 is a graph illustrating a schematic relation between the output current and the gas flowrate of the sensor element driving circuit portion in the thermal mass flowmeter of the fifth embodiment. FIG. 16 illustrates a relation when there is no droplet adhesion (normal time). In the thermal mass flowmeter 5, by detecting the gas flowrate by using the temperature difference detection bridge circuit 25 and by controlling the maximum current value of the constant current source 76 by the second current limit mechanism 102 in accordance with the output of the temperature difference detection bridge circuit 25, as illustrated in FIG. 16, a limit value of the output current of the sensor element driving circuit portion 34 can be changed in accordance with the gas flowrate. As a result, in a low gas-flowrate time when the droplet can adhere the most easily, the output current of the sensor element driving circuit portion 34 can be limited further smaller, and the calorific value of the heating element 11 when the droplet adheres can be further suppressed. This contributes to further prevention of rupture of the sensor region 15 caused by thermal deterioration or bumping of the heating element 11 at droplet adhesion in addition to ensuring of the required output current at the maximum gas flowrate.

The above described embodiments and examples are intended to be illustrative only and in no way limiting. The present invention is not intended to include all features and aspects of the embodiments and examples described above. For example, a part of an example (embodiment) may be substituted for a part of another example (embodiment) or added to another example (embodiment). Also, a part of an example (embodiment) may be removed, or replaced by one or more parts of the other examples (embodiments), or added with one or more parts of the other examples (embodiments).

LEGEND 1, 2, 3, 4 and 5 . . . thermal mass flowmeter;
10 . . . sensor element portion;
11 . . . heating element;
12 . . . silicon substrate;
13 . . . first insulating film;
14 . . . second insulating film;
15 . . . sensor region;
16 . . . sensor element portion;
20 . . . temperature detection bridge circuit;
21 . . . temperature detection resistor;
22, 23 and 24 . . . fixed resistor;
25 . . . temperature difference detection bridge circuit;
26 and 29 . . . upwind temperature detection resistor;
27 and 28 . . . downwind temperature detection resistor;
30, 31, 32, 33 and 34 . . . sensor element driving circuit portion;
40 . . . output impedance adjustment mechanism;
41 . . . electric resistor;
50 . . . output mechanism;
51 . . . amplifier;
52 . . . current limit mechanism;
60 . . . output impedance adjustment mechanism;
61 and 62 . . . MOS transistor;
63 . . . electric resistor;
65 . . . output impedance adjustment mechanism;
70 . . . output mechanism;
71 . . . amplifier;
72 . . . MOS transistor;
73 . . . electric resistor;
74 and 75 . . . MOS transistor;
76 . . . constant current source;
77 . . . current limit mechanism;
80 . . . output mechanism;
81 . . . comparator;
82 . . . PI controller;
83 . . . current output type DA converter;
84 . . . input limiter;
85 . . . limiter adjustment mechanism;
86 . . . constant current source;
87, 88, 89, 90 and 91 . . . MOS transistor;
92, 93, 94 and 95 . . . inverter;
96, 97, 98 and 99 . . . MOS transistor;
100 . . . output mechanism;
101 . . . amplifier; and
102 . . . second current limit mechanism.

The invention claimed is:

1. A thermal mass flowmeter for measuring a mass flowrate of a gas flow, comprising:
a sensor element portion having a heating element for generating heat by conduction and a temperature detection bridge circuit for detecting a temperature of the heating element; and
a sensor element driving circuit portion connected to the sensor element portion and executing conduction control to the heating element,
wherein:
the sensor element driving circuit portion has an output mechanism and an output impedance adjustment mechanism;
the output impedance adjustment mechanism is disposed between the output mechanism and the heating element;
an output impedance of the output impedance adjustment mechanism is higher than an electric resistance value of the heating element and less than 1 MΩ;
the conduction control is current control; and
an impedance of the output mechanism is higher than the electric resistance value of the heating element, and an output impedance of the sensor element driving circuit portion is lowered by the output impedance adjustment mechanism.

2. The thermal mass flowmeter according to claim 1, wherein the output mechanism has a current limit mechanism for limiting a current to the heating element.

3. The thermal mass flowmeter according to claim 1, wherein the output impedance adjustment mechanism is constituted by a current mirror circuit.

4. The thermal mass flowmeter according to claim 3, wherein
the output impedance adjustment mechanism further has an electric resistor that is disposed between the current mirror circuit and the heating element.

5. The thermal mass flowmeter according to claim 1, wherein the sensor element driving circuit portion has a current output type digital-analog converter.

6. The thermal mass flowmeter according to claim 5, wherein
the sensor element driving circuit portion further has an input limiter for limiting an input value to the current output type digital-analog converter.

* * * * *